United States Patent [19]

Smith

[11] 4,215,636

[45] Aug. 5, 1980

[54] MACHINE FOR ENGAGING AND ROTATING CONCRETE CROSSTIE BOLTS

[75] Inventor: Irving E. Smith, Jacksonville, Fla.

[73] Assignee: Florida East Coast Railway Company, Augustine, Fla.

[21] Appl. No.: 914,544

[22] Filed: Jun. 12, 1978

[51] Int. Cl.$^2$ ............................................. E01B 29/28
[52] U.S. Cl. .................................... 104/17 R; 91/443; 91/463
[58] Field of Search ....................... 104/1, 2, 16, 17 R; 91/443, 451, 463

[56] References Cited

U.S. PATENT DOCUMENTS

| | | | |
|---|---|---|---|
| 3,064,428 | 11/1962 | Plasser et al. | 104/17 R |
| 3,202,060 | 8/1965 | Grotness | 91/443 |
| 3,625,007 | 12/1971 | Herndon, Jr. | 91/451 |
| 3,722,423 | 3/1973 | Plasser et al. | 104/17 R |
| 4,051,764 | 10/1977 | Murata | 91/451 |

Primary Examiner—John J. Love
Assistant Examiner—Ross Weaver

[57] ABSTRACT

A machine adapted for travel along a pair of railway rails supported by concrete crossties and arranged to be attached thereto by a pair of clips disposed inside and outside of each rail together with a bolt passing through each clip into threadable engagement within the crosstie. An engine on the machine powers a pressurized fluid system which, according to control signals from an operator on the machine, moves the machine along the rails and according to other control signals moves work heads so as to position fluid driven sockets in engagement with the heads of the four bolts to be inserted into or removed from a crosstie. Devices on the machine then are operated to simultaneous screw or unscrew the bolts into or from the crosstie and during this operation each bolt is torqued to a specified limit.

9 Claims, 4 Drawing Figures

TO FIG. 3B

MACHINE FOR ENGAGING AND ROTATING CONCRETE CROSSTIE BOLTS

BRIEF SUMMARY OF THE INVENTION

This invention relates to a machine designed to move, under its own power, along railway track in which two rails are secured to a plurality of concrete crossties by means of rail clips with a bolt passing through each clip into tight threadable engagement within a receptacle in the crosstie. More particularly the machine has a hydraulic system which is associated with an electrical system so that an operator can initiate electrical command signals for the hydraulic system to position the machine and work heads on the machine in a desired location and so that a bank of four sockets can be engaged with the heads of the respective bolt in position to be inserted into tight engagement within the crosstie or to be removed therefrom. The sockets are hydraulically rotated simultaneously, according to the invention, to screw or unscrew the bolts into or from the crosstie and with each bolt torqued to its specified limit.

Concrete crossties are used to support a pair of rails in a track and it is customary to provide tie pads between the rails and each crosstie. In addition it is customary to use clips which are disposed on the inside and outside of the base of the rails and are secured to the crossties by means of bolts. As the bolts are tightened by threading them into receptacles provided in the crossties the heads of the bolts press against their associated clips and in turn force the clips into tight engagement with their respective rails so as to firmly secure these rails to the crossties of the track.

It will be appreciated that in the operation of securing the clips between their associated rails and a crosstie on which the rails rest it is important that each bolt be tightened to a specific torque to obtain an optimum securement of the rails in the track. If, for example, the bolts are not tightened sufficiently there will be a loose securement of the rails to the crosstie and this of course can result in serious problems such as train derailment etc.. On the other hand to much tightening can result in broken bolts and bolts which will fail in operation.

Heretofore individual bolts have been tightened or unscrewed from a crosstie by operators using hand-held tools. Often the amount the bolt was tightened or the force applied to unscrew a bolt from a crosstie depended on the judgment of the operator which might or might not produce good results. Furthermore it is apparent that this type of operation requires a number of operators and is necessarily a slow operation.

It is therefore an object of the invention to provide a machine which can tighten or remove simultaneously all four bolts disposed between their respective clips and a crosstie and to do so in such a manner that, in either operation, no more than a predetermined torque is applied to the heads of the respective bolts.

It is a further object of the invention to provide in the machine an electrically controlled hydraulic system whereby an operator can quickly position the machine with respect to a concrete crosstie which is to be worked on and engage the elements on the machine which are designed to rotate the bolts with the heads of these bolts.

The above-listed objects of the invention are achieved, in accordance with the invention, by providing, on a track machine, hydraulic systems which are under the control of the operator through electrical signals from a control panel or panels located near the operators position where he can closely observe work heads on the machine and the bolts on a crosstie.

DESCRIPTION OF THE PREFERRED EMBODIMENT OF THE INVENTION

Figure 1:
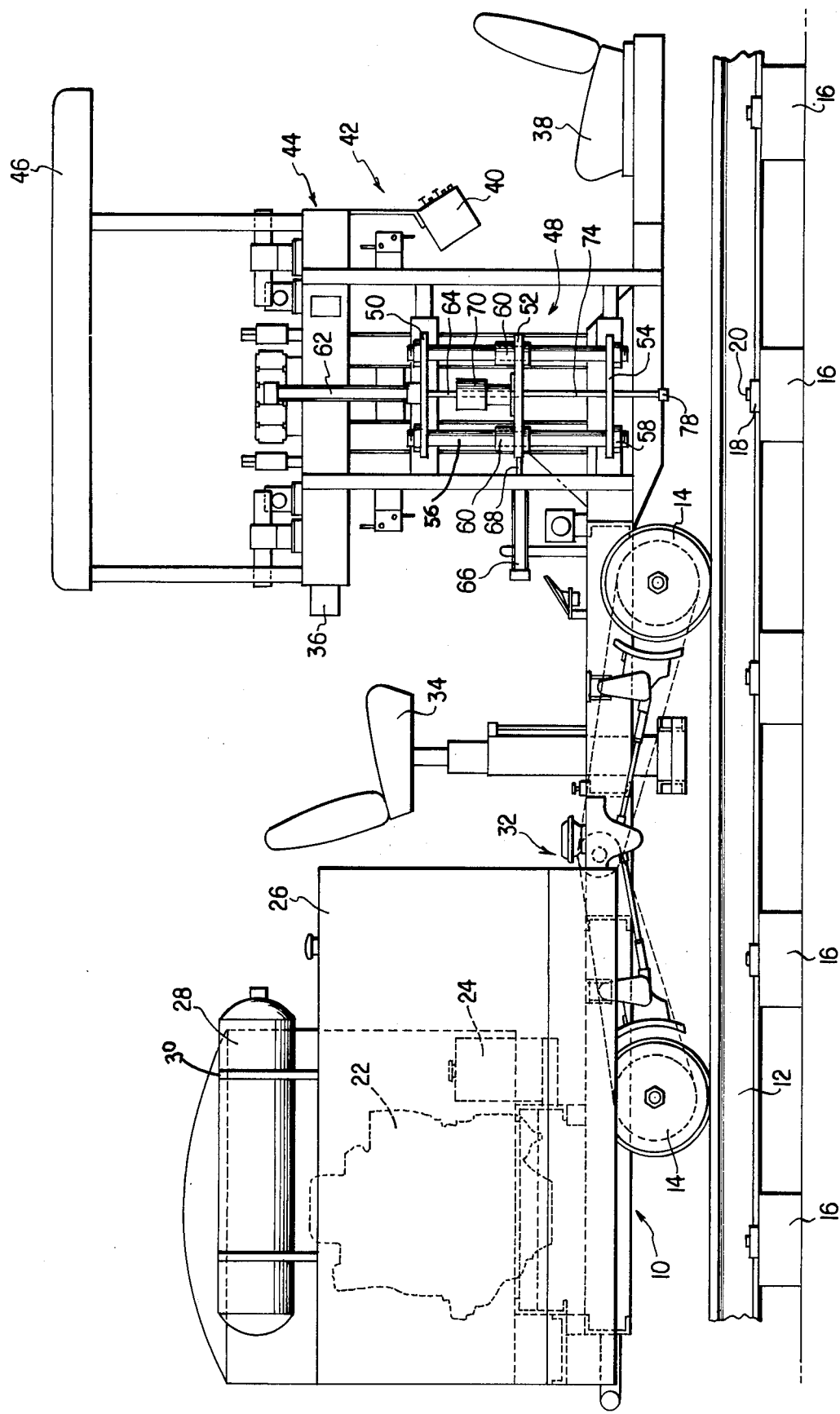
FIG. 1 is a side elevational view of the machine.
Figure 2:
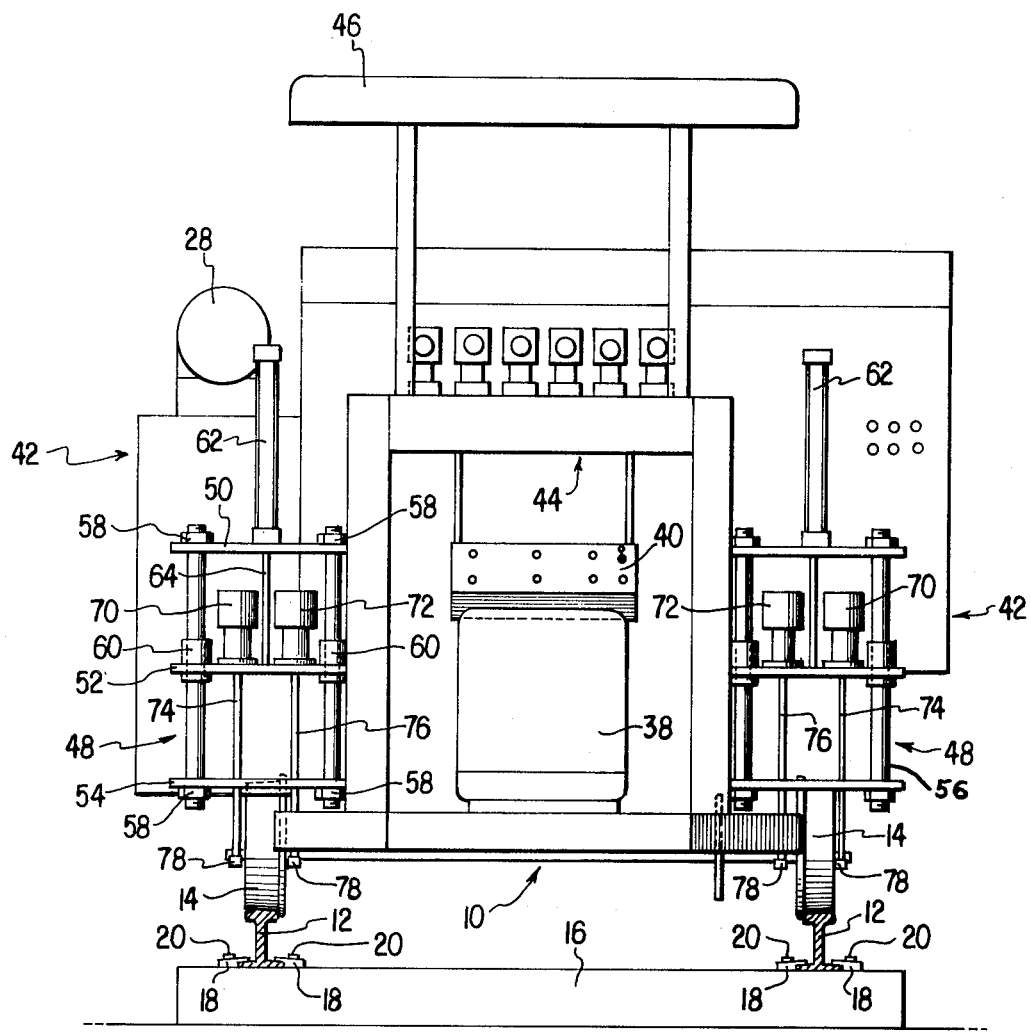
FIG. 2 is a front end elevational view of the machine as seen from the right in FIG. 1.

As seen in FIGS. 1 and 2 the machine has a frame, generally designated at 10, which is supported for movement along the rails 12 of a railway track by flanged wheels 14. The rails are secured to concrete ties 16 through the use of clips 18, a pair of which engage the base of each rail, and which are fastened to the ties 16 by means of cap bolts 20. As best seen in FIG. 2 there are four cap bolts 20 used in conjunction with each concrete tie and there are bolts on the outside and inside of each rail of the track. The spacing of the bolts is determined by the threaded receptacles provided in the upper portion of the tie, not shown, when it is manufactured. This matter will be discussed in more detail later.

The machine frame 10 supports a diesel engine 22 which is the source of power for moving the machine along the track and operating the arrangement carried on the frame to engage and rotate the bolts. A fuel tank 24 provides fuel for the engine and there is a tank 26 for hydraulic fluid, preferably oil, and pumps, not indicated, driven by the engine to supply fluid under pressure to the systems according to the invention. A silencer 28 for the engines is supported on posts 30 above the engine.

One use of the pressurized fluid is to drive, through the use of a hydraulic motor and an associated chain system connected to the flanged wheels 14, generally indicated at 32, these flanges wheels to move the machine along the track. This drive is under the control of operator who can sit on seat 34 and control the supply of fluid to the motor through a suitable electrical circuits activatable from the control panel 36. The operator generally occupies seat 34 when the machine is to be moved for relatively long distances along the railway track.

As such a drive system for track machines, briefly described above, is well known in the field and as any suitable commerically available system can be used in conjunction with the machine, the details of such system are not shown.

Considering that the forward motion of the machine is to the right, as seen in FIG. 1, there is provided at the front end of the machine another seat 38 for the use of the operator when he faces another control panel 40. This panel 40 carries the switches and other instruments designed for the control of the portion of the machine which is designed for engaging and rotating the bolts. This portion of the machine is generally designated at 42. This panel also carries the necessary switches so the operator can activate the motor and chain system 32 to move the machine from crosstie to crosstie.

As indicated above the machine operator uses control panel 36 to move the machine to the location where bolt-tightening or bolt-loosening operations are to be performed. It will be understood that, in the case of new track, laborers will have already manually started the bolts into the crossties and the bolts will be vertically disposed with their heads at the top ends of the bolts. In the case of old track the bolts will be in various states to tightness with relation of their associated clips. To continue the operation after the machine is at the desired location the operator moves to a position facing panel 40 to control the machine operation as it is moved from tie to tie to perform its work function in a manner to be described now.

The portion 42 has a central upright frame section, generally designated at 44, carried on frame 10 and with supports for a roof 46. Guidably supported at each side of the frame 44 for vertical and horizontal movements are what hereinafter will be referred to as work heads 48. These two work heads each consist of three metal plates 50, 52, and 54 which are interconnected by four rods 56 which are threaded at each end to receive nuts 58 and are disposed at the four corners of the respective plates.

It will be noted that plate 52 is slidably received on rods 56, as by means of sleeves 60, while plates 50 and 54 are fixed in spaced relationship to each other. Each work head plate 50 carries a hydraulic cylinder 62 with a piston rod 64 protruding from the lower end thereof to extend through plate 50 and to be fixed, at its lower end, to plate 52. With this arrangement the plate 52 of the work head can be raised and lowered with respect to the rails of the track and more particularly with respect to the top surfaces of the concrete ties supporting the rails. This, of course, is accomplished by the operator using the control panel 40 to control the supply of pressurized fluid to the cylinders 62. This will be described in more detail later.

In addition to controlled vertical movement of Plates 52 within the work heads 48 these heads are guided on frame 44 for horizontal movement, i.e. longitudinally with respect to rails 12. This movement is achieved through the use of hydraulic cylinders 66 and there is a cylinder associated with each work head. As best disclosed in FIG. 1 the end of the piston rod 68 extending from the cylinder 66 is attached to plate 52 so that, on signals from the control panel 40, the respective work heads can be hydraulically urged back and forth along a limited portion of the rail length. This operation will be referred to hereinafter as a spotting operation.

As best seen in FIGS. 1 and 2 each plate 52 carries two hydraulic motors 70 and 72 equipped with spindles 74, and 76, respectively and each spindle has, at its lower end, a socket 78. In a machine now in use these are 1⅛ inch hex head sockets to correspond to the heads of the bolts being worked on by the machine. Obviously these sockets can have any desired size to fit the work requirements.

It shall be noted that sockets 78 on spindles 74 are, as viewed in FIG. 2, designed to be vertically aligned with the heads of bolts 20 securing the outside clips 18 and sockets 78 on spindles 76 are designed to be aligned vertically with the heads of the bolts 20 which secure the inside clips 18. The spacing between spindles 74 and 76 is determined by the spacing of the bolt receptacles of the particular tie being used in the track on which the machine is being worked but such spacing can be changed to meet the conditions found in other track.

At this point it will be appreciated that, with respect to a tie in which the bolts are in position through their associated clips, it is necessary for the operator to position the machine so that the sockets 78 can be dropped into engagement with the heads of the cap bolts 20 and the sockets then be driven at a controlled rate to rotate the bolts into or out of the ties with a predetermined torque. This is accomplished in two stages, namely the engagement of the sockets on the heads of the bolts 20 and then rotation of the bolts to either tighten them against their associated clips or to unloosen them with respect to these clips.

In the first stage the machine is moved to a position where the work heads 48 are over the crosstie which is to be worked on and with the sockets disposed as closely as possible over the heads of the bolts 20 located inside and outside of respective rails 12. As the bolt tightening or untightening operation for a particular stretch of track usually involves a series of crossties the machine is driven, by an operator occupying seat 34 and controlling the hydraulic motor system 32, to the location of the first tie to be worked upon. It will recalled that the sockets 78 on each work head 48 are spaced apart a distance equal to that of the spacing between the receptacles in the crossties so that when the sockets are transversely aligned with the heads of the bolts, i.e. in the sense of along the rails, these sockets will be correctly positioned above their associated bolts.

In order to transversely align the sockets 78 and heads of all four bolts 20 on a particular crosstie the so-called spotting operation is performed. An operator, who has moved from his machine travel position on seat 34 to his work position on seat 38, is in a good position to see the bolts 20 and the sockets 78 and operates via electrical signals, initiated through switches on the control panel 40, electromagnet valves, to be described, in order to activate hydraulic cylinders 66. Piston rods 68 are extended and retracted according to the operator's commands to move the work heads 48 over the respective rails in the longitudinal direction of such rails. By manipulating the appropriate switches, not shown, on control panel 40 the operator, in the manner of a fine control, can spot the sockets 78 above the heads of the bolts 20.

Figure 3A:
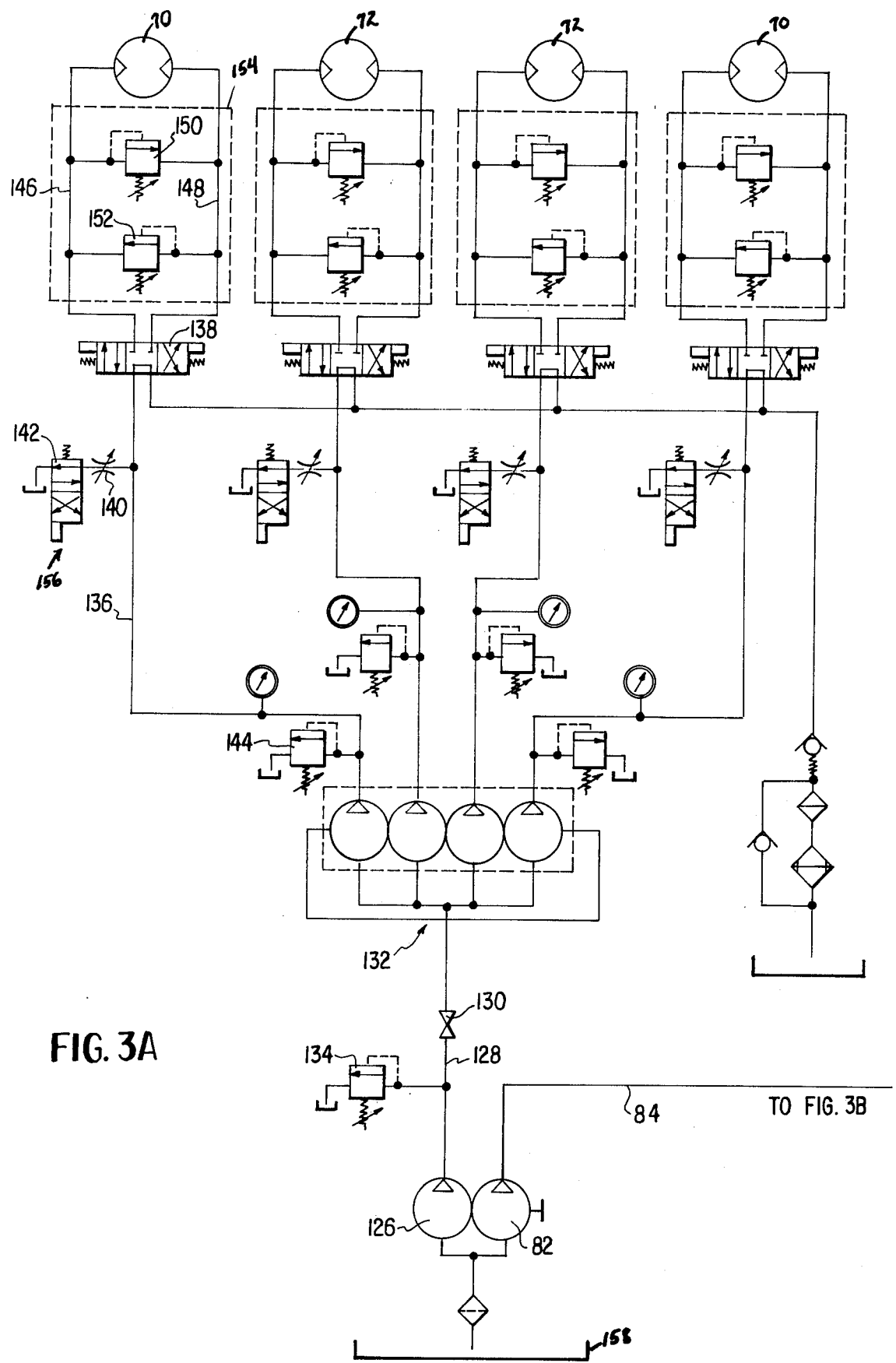
FIGS. 3 A and 3 B are diagrammatic views of the hydraulic system as associated with the cylinders and motors according to the invention.
Figure 3B:
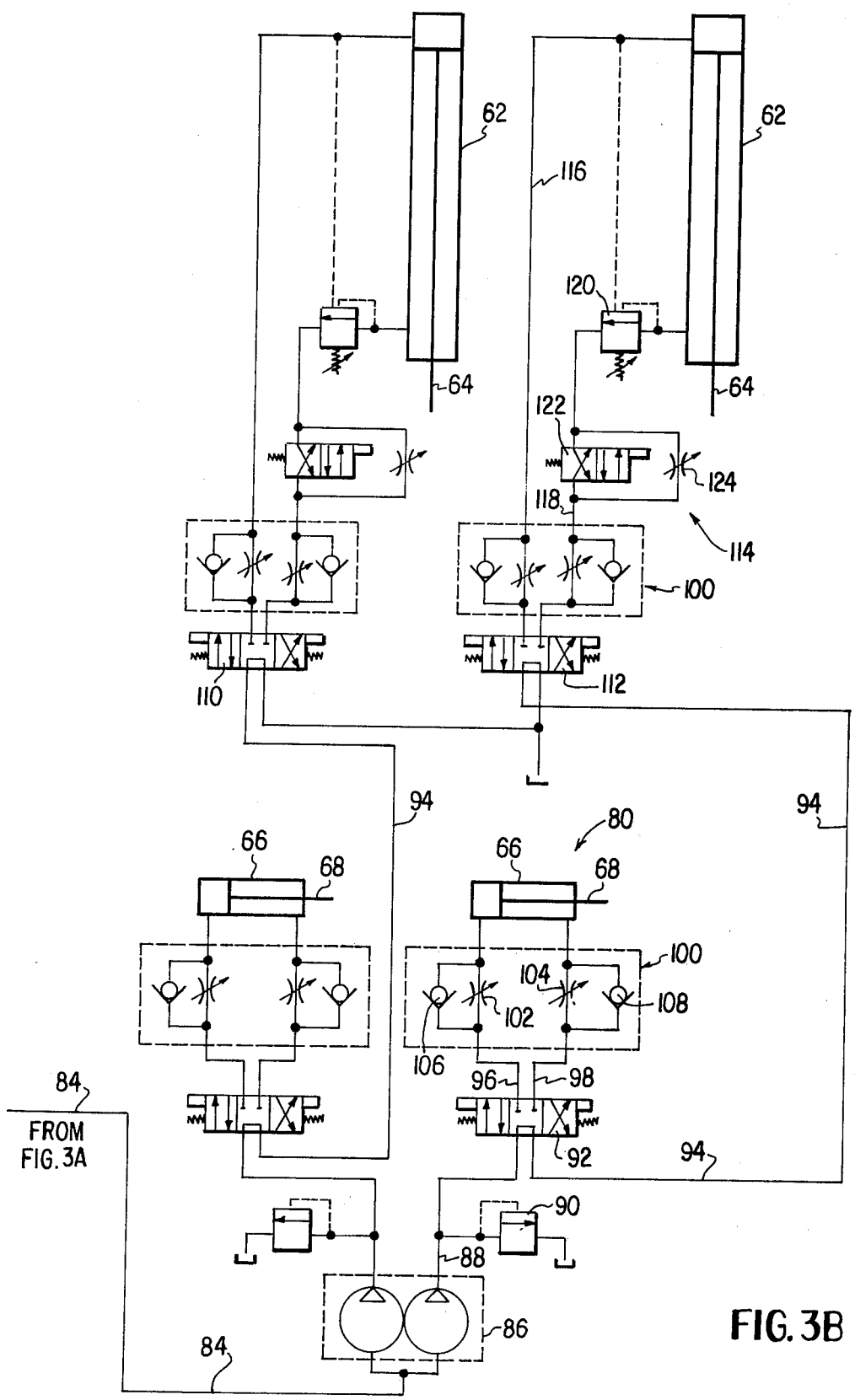

Attention is directed to FIGS. 3 A and 3 B and particularly to the lower section of FIG. 3 B which shows the hydraulic devices and control means, generally designated at 80, used in the work head spotting operation. Pump 82, one of the pumps driven by engine 22, supplies oil under pressure through line 84 to flow divider 86 from which oil is fed via parallel circuits to each of the respective cyclinders 66. As these circuits are the same only one will be described.

Line 88 with a pressure relief valve 90 connected thereton, leads from the flow divider to a solenoid operated valve 92 that provides a connection to a supply line 94 leading to another system, according to the invention, to be described later. In a known manner the valve 92 is activated upon electrical signals initiated by an operator from control panel 40 to direct the oil under pressure into either line 96 or 98. These lines pass through a control arrangement, generally indicated at 100 and described immediately below, to the hydraulic cylinder 66 and it will be understood that piston rod 68 will be extended or retracted, with respect to this cylinder, depending on whether pressurized fluid is directed through line 96 or 98.

In control arrangement 100, hereinafter referred to as adjustable bypass valves, lines 96 and 98 have adjustable flow control orifices 102 and 104, respectively, with check valves 106 and 108 bypassing them. By adjusting the control orifices the operator can determine the speed of which the spotting operation takes place.

Assuming now that the sockets 78 have been spotted with respect to the heads of the four bolts 20 on a particular crosstie, then the next operation involves lowering the sockets into engagement with the bolts. Down feed of the sockets toward and into engagement with the bolt heads is acccomplished by activating cylinders 62. This is done by the operator who sends electrical control signals, via switches at the control panel 40, to the solenoid operated valves 110 and 112 receiving oil under pressure from supply lines 94, as shown in the upper portion of FIG. 3 B. The reference numeral 114 indicates, generally, the hydraulic circuits for raising and lowering the plates 52 of the work heads 48 by means of the hydraulic cylinders 62. As the circuits for each cylinder are the same only one will be described below.

Valve 112 directs oil under pressure either through line 116 or line 118 to the top or bottom side, respectively, of cylinder 62 so as lower or raise plate 52 carrying the hydraulic motors 70 for the sockets 78. It will be noted that both lines 116 and 118 pass through an adjustable bypass valve 100 like those used in the spotting operation and bearing the same reference numeral. Pressure relief valve 120 is provided for both lines 116 and 118 and an solenoid operated valve 122, with a bypass adjustable control orifice 124 is in line 118.

The solenoid operated valve 122 operates simultaneously with its associated solenoid operated valve 112 to control oil flow to cylinder 62. These valves operate to start the down feed of the plates 52 carrying the hydraulic motors 70 and 72, the spindles 74 and 76 and the sockets 78. This down feed continues until the sockets reach and engage with the heads of the bolts 20. The adjustable bypass valves 100 can be set to maintain approximately 50 pounds per square inch down or up feed while tightening or loosening the bolts. This insures that there will be no socket slippage.

It will be understood that it may be necessary to continue the spotting operation during the time the sockets are being lowered toward the heads of the bolts.

As shown in FIG. 3 A, from pump 126, driven by engine 22, line 128 leads through an on/off valve 130 to a flow divider, generally indicated at 132, and a relief valve 134 is connected off of this line 128. The flow divider is connected through four identical hydraulic systems to respective hydraulic motors 70 and 72, seen at the top of FIG. 3 A, which motors, as explained above, operate to rotate the sockets 78 associated therewith. As these systems are identical only one need be described.

A line 136, from the flow divider 132 leads to solenoid operated control valve 138 and branched off this line is an adjustable flow control orifice 140 with an associated solenoid operated control valve 142 and at a separate point a relief valve 144.

Lines 146 and 148 lead from the control valve 138 to the motor 70 and it will be understood that the manner in which the pressurized oil is directed into these lines by the control valve will determine the direction in which the motor rotates its associated sockets 78. The direction chosen by the operator will depend, of course, on whether the machine is being used to tighten or untighten the bolts on a particular crosstie.

Between the lines 146 and 148 are adjustable flow relief valves 150 and 152 and the system, as enclosed within the dash lines box, generally indicated at 154, will be referred to hereinafter as an adjustable dual stage relief valve. Its operation will be explained later.

Attention is directed now to the system, generally indicated at 156, the adjustable flow control orifice 140 and its associated solenoid operated control valve 142. In conjunction with a description of this portion of the hydraulic system, as according to the invention, it should be borne in mind that the hydraulic circuits generally indicated at 114 in the upper portion of FIG. 3 B, provide the activating means for moving the sockets 78 into engagement and disengagement from the heads of the bolts 20. The system 156 is provided so that, at the times in the operation of the system 114 when the sockets 78 are to go into and out of engagement with the heads of the bolts, the socket will be rotating slowly. This is advantageous as it permits the quick engagement or disengagement of the sockets and also the rapid increase of rotational speed of the sockets when the operator sees that all sockets are properly engaged for screwing or unscrewing the bolts into or out of the crossties.

System 156 operates to divert, in the position of the valve 142 shown in FIG. 3 A, the majority of the pressurized oil, being fed from the flow divider 132 through line 136, valve 138 and the adjustable dual stage relief valve 154 to the motor 70, to the reservoir tank 158. This causes the motor 70 to drive its associated spindle and socket in slow rotation. On a electrical command signal from the operator as initiated through control panel 40, valve 142 is caused to move to a position to block diversion of oil from line 136 and the motor 70 receives an increased supply of oil causing it to immediately drive the socket at a desired working speed.

As previously mentioned the system, according to the invention, provides for the motor driven sockets 78 to simultaneously operate on the heads of the four bolts on a particular crosstie and in doing so to tighten and untighten the bolts, relative to their associated clips, with a predetermined torque setting. This is accomplished through the use, as according to the invention, of the adjustable dual stage relief valve 154 with each hydraulic motor 70.

It is apparent that the relief valves 150 and 152 can be set to a desired pressure so as to divert oil from a motor 70 either in a bolt tightening or untightening operation. This, of course, ensures that the bolt being worked on by the socket driven by a particular motor is subjected only up to a specified torque. On the other hand the arrangement associated with the other motors all work independently but in the same manner. In summary there are eight relief valves provided by the four adjustable dual state relief valves 154 with each one of these eight working independently. When a desired torque is reached all excess oil is circulated, via the valve 138, back to the tank or reservoir 158.

The track machine according to the invention thus provides, through the use of the hydraulic systems described above, for accurately and quickly spotting working tools above the heads of bolts carried on crossties of the track. The invention further provides, through these hydraulic systems, for positively engaging these tools with their respective heads of bolts of a controlled speed of rotation and once in engagement with maintenance of a contact pressure designed to ensure full engagement of the tools on the heads in either direction of rotation and under a higher rate of rotation. And even further the invention provides for the simultaneous operation of all working tools on the bolts and each of these tools operates on its particular bolt with no more than a preset torque force.

I claim:

1. A machine for engaging the heads of bolts and rotating these bolts that are threadably engageable within a series of at least four apertures aligned along the length of a surface of a concrete crosstie which is adapted to support, on this surface, a pair of railroad rails in a predetermined spaced relationship, at least two pairs of these bolt-receiving apertures being disposed in spaced relationship so that each pair of apertures receives the base of an associated rail therebetween, each rail being secured to the crosstie by a pair of clips engaging the base of each rail and with each clip being secured to the crosstie by one of the bolts passing through the clip and into threadable engagement within an associated aperture, the machine having, in combination:

A. A frame supported for movement along the rails by rail-engaging wheels, a source of power carried on said frame and driving hydraulic pump means having a reservoir to provide a source of fluid under pressure, a pair of work heads carried by said frame and so disposed that each work head is in alignment, longitudinally, with an associated rail and is disposed above the rail;
   B. Hydraulic drive means carried on said frame and operatively connected to each of said work heads, said hydraulic drive means selectively receiving fluid under pressure from a first hydraulic means, carried on said frame, to move said work heads, at a controlled rate of speed, in a direction back and forth and in a direction generally parallel to the rails and longitudinally thereof;
   C. Second hydraulic drive means carried on each work head to selectively receive fluid under pressure from a second hydraulic means carried on said frame and being operatively connected to a portion of said work head to move this portion vertically up and down with respect to an associated rail, each of said portions carrying a pair of hydraulic motor adapted to selectively receive fluid under pressure from a third hydraulic means, said motors driving downwardly extending spindles carrying at their lower ends sockets, corresponding in size with the heads of the bolts, which sockets are disposed in a spaced relation corresponding to the distance between the apertures receiving the bolts for the pair of clips, said second hydraulic means including adjustable bypass valve means that operates to maintain a predetermined down feed pressure on each socket after these sockets engage their respective bolt heads as said portion is urged down through operation of said second hydraulic drive means and said bypass valve means functions to further maintain this predetermine pressure during a subsequent downward or upward movement of said portion of said work head while said sockets are in engagement with the bolt heads; and
   D. Said third hydraulic means being carried on said frame and selectively supplying fluid under pressure to said motors to rotate said sockets simultaneously in either a clockwise or a counter clockwise direction, said third hydraulic means including a hydraulic diversion system associated with each of said hydraulic motors, which system is selectably activated to divert a desired amount of fluid under pressure from its associated motor to said reservoir during that period of time said sockets are being urged into and out of engagement with their associated bolt heads, said third hydraulic means further including adjustable dual state relief valve means associated with each of said motors and operable in either direction of rotation of said sockets to limit to a predetermined amount the torque force applied to the respective bolt heads by an engaged socket, whereby all of said motors can be operated simultaneously.

2. A machine as defined in claim 1, wherein the delivery of fluid under pressure through said first, second and third hydraulic means is selectively controlled by electrical command signals initiated by a human operator and conducted to solenoid operated valves in fluid conducting lines in each of said hydraulic means, which lines conduct fluid under pressure from said source of fluid under pressure to said hydraulic drive means, said second hydraulic drive means, and said hydraulic motors respectively.

3. A machine is defined in claim 2, wherein said hydraulic drive means are hydraulic cylinders.

4. A machine as defined in claim 2, wherein said first hydraulic means includes adjustable bypass valves with adjustable flow control orifices in said fluid conducting lines of said first hydraulic means whereby the rate of speed at which said work heads are moved by said hydraulic drive means can be set at a desired value.

5. A machine as defined in claim 2, wherein said second hydraulic drive means are hydraulic cylinders.

6. A machine as defined in claim 2, wherein said adjustable bypass valve means includes adjustable flow control orifice in said fluid conducting lines of said second hydraulic means whereby the delivery of fluid under pressure to said second hydraulic drive means can be set at a desired value.

7. A machine as defined in claim 2, wherein said hydraulic diversion system for each of said motors consists of an adjustable flow control orifice and a solenoid operated valve in a secondary line connected between said motor and said reservoir of said hydraulic pump means, said solenoid operated valve being operated selectively, by electrical command signals, to divert fluid under pressure, at a controlled rate, from said motor or to block diversion of fluid.

8. A machine as defined in claim 2, wherein said adjustable dual stage relief valve means consists of a pair of adjustable flow relief valves interposed between said fluid conducting lines conducting fluid under pressure to each motor and said hydraulic pump means so as to return fluid to said pump means when the fluid pressure reaches a predetermined value, whereby the power delivered by said motor can be limited to a desired value and this is independent of the operation of the remaining motors.

9. A machine as defined in claim 1, further having in combination a hydraulic motor and associated claim system connected to said rail-engaging wheels and carried on said frame, said motor being selectively activable under electrical command signals initiated by a human operator to drive said rail-engaging wheels and move the machine along the rails in forward and reverse directions.

* * * * *